United States Patent [19]

Cantwell

[11] Patent Number: 4,669,014
[45] Date of Patent: May 26, 1987

[54] ALIGNMENT SYSTEM FOR MAGNETIC DISC DRIVE

[76] Inventor: Gill Cantwell, 2434 Purdue Ave. #17, Los Angeles, Calif. 90064

[21] Appl. No.: 825,957

[22] Filed: Feb. 4, 1986

Related U.S. Application Data

[63] Continuation of Ser. No. 462,299, Jan. 31, 1983, abandoned.

[51] Int. Cl.⁴ ............................................... G11B 5/56
[52] U.S. Cl. ..................................... 360/109; 360/106
[58] Field of Search ............... 360/104, 105, 106, 109, 360/97, 99, 75, 76

[56] References Cited

U.S. PATENT DOCUMENTS 3,641,529  2/1972  Bitzer et al. ........................... 360/75

FOREIGN PATENT DOCUMENTS 2906999  9/1980  Fed. Rep. of Germany ........ 360/76

Primary Examiner—John H. Wolff
Assistant Examiner—Andrew L. Sniezek
Attorney, Agent, or Firm—Nilsson, Robbins, Dalgarn, Berliner, Carson & Wurst

[57] ABSTRACT

A magnetic disc drive including a carriage for transporting the magnetic transducers relative to the magnetic disc for reading/recording data thereon. The carriage is sandwiched between a chassis and a support assembly for movement in response to the rotation of a drive motor. A pair of adjusting levers are disposed for movement of the support assembly and along therewith the carriage to properly position the magnetic transducers both angularly and radially with respect to the magnetic disc.

10 Claims, 13 Drawing Figures

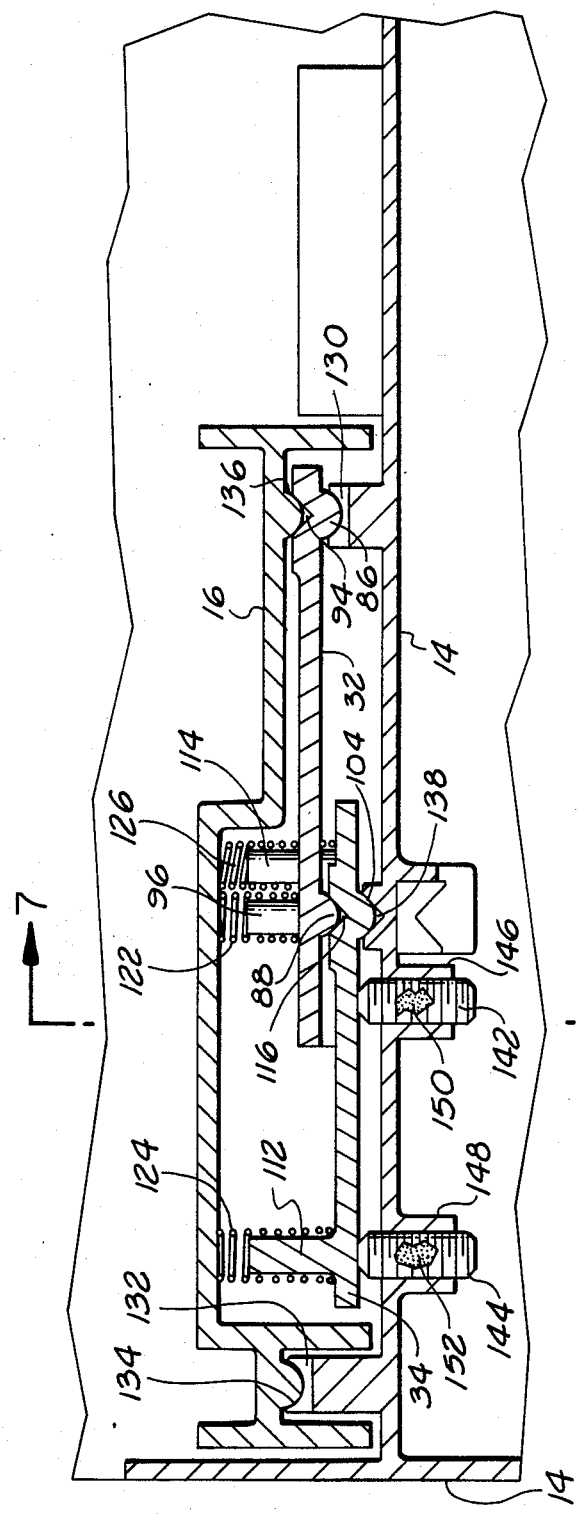
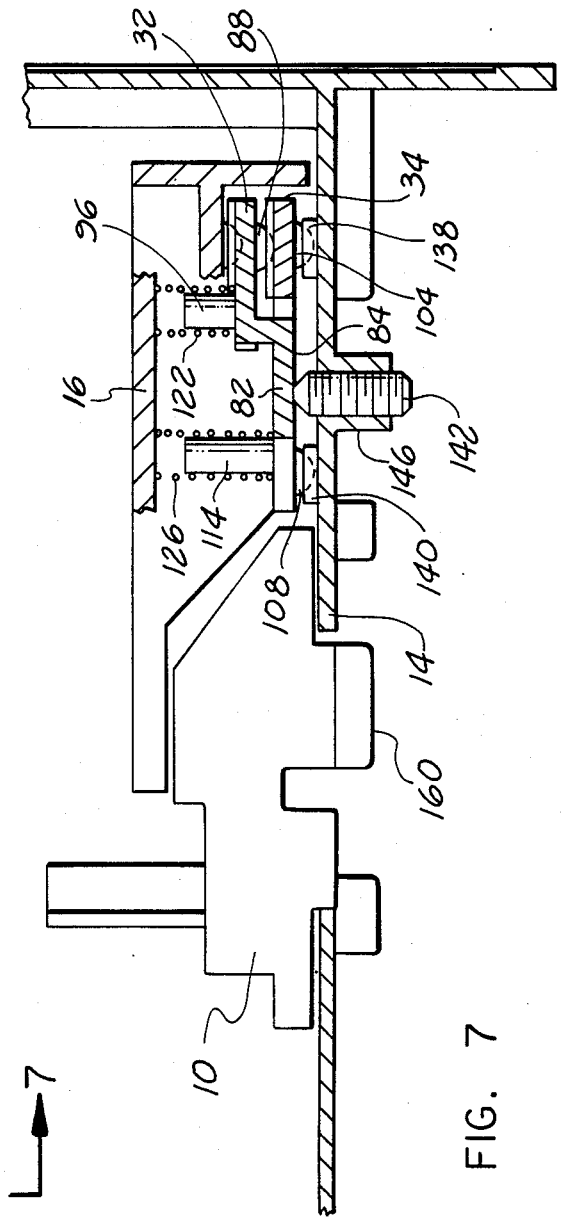
FIG. 6
FIG. 7

ALIGNMENT SYSTEM FOR MAGNETIC DISC DRIVE

This is a continuation of application Ser. No. 462,299, filed 1/31/83, now abandoned.

BACKGROUND OF THE INVENTION

All prior art disc drives include some means of adjusting the magnetic transducer locations in a radial direction to permit the best possible agreement with standardized data track or ring positions. In the prior art, this adjustment usually requires loosening fastening devices which secure a rotary stepper motor to its supporting structure. Thereafter the stepping motor is rotated until the desired radial position of the transducer is achieved, at which time the fastening devices are secured.

Frequently, the motor to be rotated is too hot to touch, and tools or gloves must be used to effect the rotation. Also, the act of re-securing the fastening device often causes a change in the adjustment, requiring multiple loosen-adjust-tighten sequences before a satisfactory adjustment is achieved. Because of the time and difficulty of performing these multiple adjustment sequences, wider than optimum alignment tolerances are adopted as practical necessities.

A further problem is the excessively fine adjustment required. For example, a 200 step per revolution motor driving a carriage containing the transducer means at a pitch of 96 increments per inch requires an adjustment of $\pm 1/58$ of an angular degree in order to align the carriage within $\pm 100$ microinches of the standardized position.

In these systems which are adjustable by rotating the stepper motor, the electrical connections to the motor must necessarily be flexible to permit that rotation. In practice this adds the expense of manufacturing and terminating six to eight flexible conductors.

Most drives have no means of adjusting the transducer locations in a tangential or angular direction. Frequently expensive machining operations are used to achieve an acceptable degree of assembled alignment. One prior art design provides an angular adjustment by loosening two motor support screws, and laterally sliding a motor support before retightening the two screws. This design suffers all of the problems described heretofore in the prior art radial adjustment systems.

SUMMARY OF THE INVENTION

It is an object of the present invention to provide a transducer positioning system which can be quickly and easily aligned to a standard position without special skills.

It is another object of the present invention to provide such a positioner which can be aligned or adjusted without movement of positioning motor coils, thereby permitting installation of such coils as fixed permanent elements on a printed circuit board.

It is a further object of the present invention to provide such a positioner which can be aligned and/or adjusted readily in the field.

The present invention includes first and second adjusting means for defining the angular and radial position of a carriage which supports magnetic transducer means for reading/writing of data on a magnetic disc.

In accordance with a more specific aspect of the present invention, each of the adjusting means includes a simple lever mechanism movable by an adjusting screw accessible externally of the drive mechanism and manipulatable at the same time the drive mechanism is rotating a magnetic disc.

BRIEF DESCRIPTION OF THE DRAWINGS

FIG. 6 is a cross-sectional view illustrating the manner in which radial adjustment is accomplished; and FIG. 7 is a cross-sectional view illustrating the manner in which angular adjustment is accomplished.

DETAILED DESCRIPTION

The alignment system and apparatus constructed in accordance with the present invention is particularly designed for the precise alignment and adjustment of the magnetic transducer heads of a floppy disc drive. Such alignment and adjustment is required to obtain the proper reading/recording of data on the floppy disc. Generally the apparatus to be aligned or adjusted is a carriage assembly which supports the magnetic transducer means and which is effectively floated between a plurality of balls which are held on opposite sides of the carriage within continuous track means. A motor is rotated and applies a positioning force to the carriage through a rack thereon to move it to a desired predetermined position for the reading/recording. The alignment or adjustment of the position of the magnetic transducer means is accomplished by manipulation of adjusting screws which may be accessed externally of the housing in which the drive is maintained.

Figure 1:
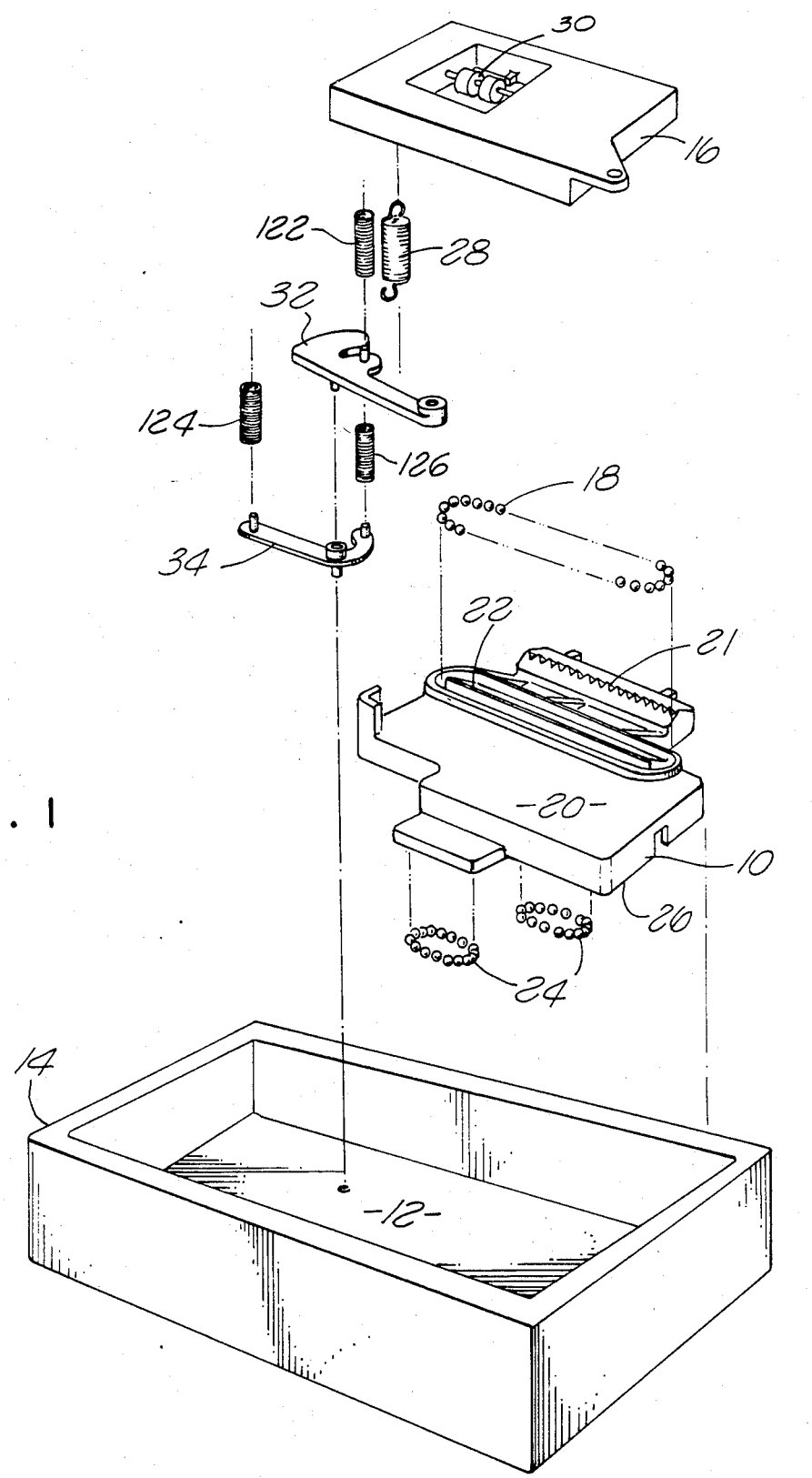
FIG. 1 is an exploded view in schematic form illustrating a part of the disc drive mechanism including the alignment means of the present invention.

As is illustrated in FIG. 1 there is provided a carriage assembly 10 which is sandwiched between the bottom surface 12 of a chassis 14 and the inner surface (not shown) of a support assembly 16. A first group of balls 18 is positioned upon one surface 20 of the carriage assembly 10 and follow a channel or groove 22 formed therein. A second plurality of balls 24 are positioned on the opposite surface 26 of the carriage 10 and are retained within a groove or channel (not shown) formed therein. A biasing means such as the spring 28 is interconnected between the support member 16 and the base 12 of the chassis 14 to urge the support member and chassis together, thus completing a continuous track within which the balls 18 and 24 travel. A means for applying force to move the carriage 10 may take the form of a motor 30 which is held within the support assembly 16 and is interconnected by means (not shown) to the rack 21 formed on the carriage 10. Alignment and adjusing members such as levers 32 and 34 are positioned intermediate the support member 16 and the chassis 14 to properly align and/or adjust the position of the carriage assembly 10. Springs 122, 124 and 126 bias the levers 32 and 34 respectively into proper operating position.

Figure 2:
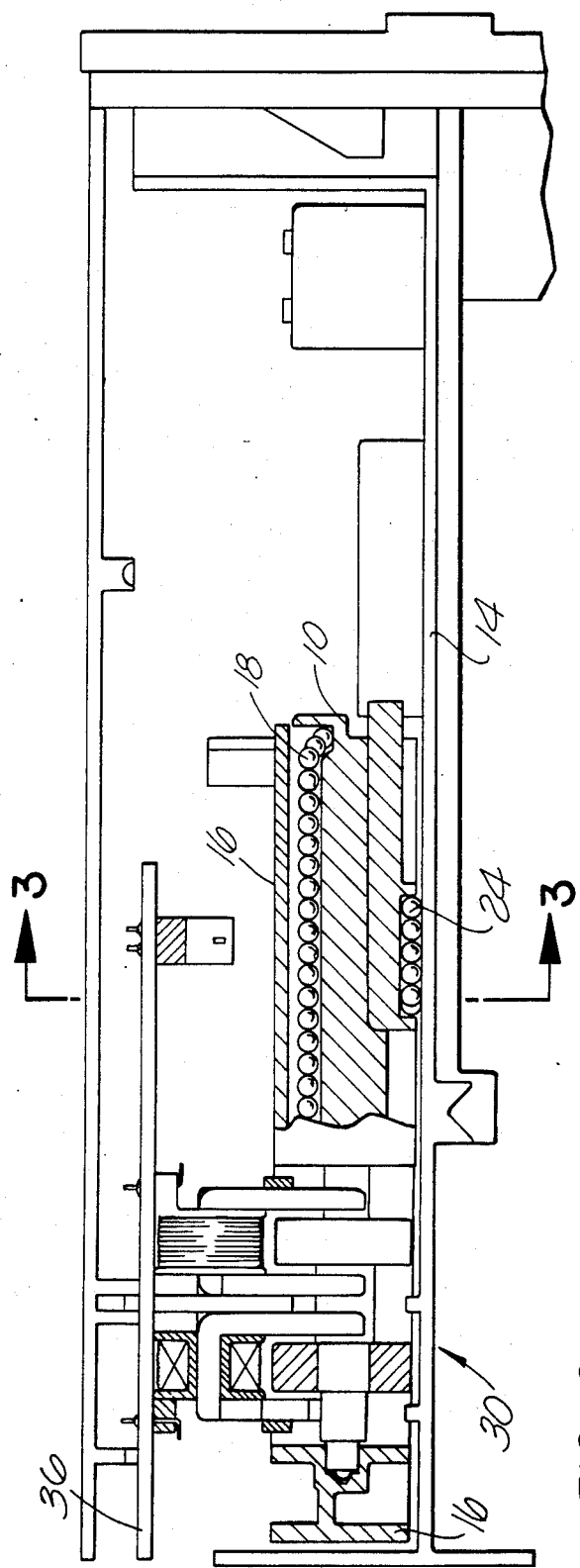
FIG. 2 is a partly cross-sectional view of a portion of the drive mechanism illustrating the manner in which the transducer supported carriage is positioned and moved.

As is shown in FIG. 2, the carriage 10 is sandwiched between the chassis 14 and the support member 16. The balls 18 are held in position between the carriage 10 and the support member 16 while the balls 24 are held in position between the opposite surface of the carriage 10 and the chassis 14. The motor is shown generally at 30 and is held in place by the support member 16 with appropriate power and control signals being applied to it through circuits positioned upon printed circuit board 36. The details of construction of the motor and the printed circuit board are not set forth herein since they form no part of the present invention but are illustrated for purposes of completeness and ease of understanding the present invention.

Figure 3:
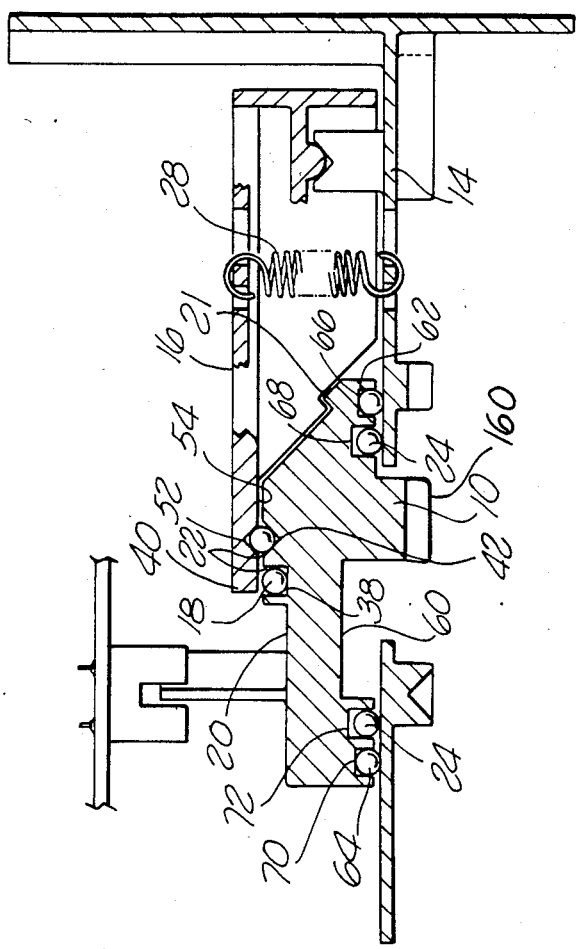
FIG. 3 is a cross-section view taken about the lines 3—3 of FIG. 2.

As is illustrated in FIG. 3, the carriage 10 forms on the surface 20 thereof, the continuous channel 22 within which the balls 18 are positioned. Additionally, a magnetic transducer 160 is mounted to the carriage 10. Preferrably the carriage 10 is made from a fiberglass-filled, polycarbonate plastic which has been appropriately molded. It should be understood, however, that the carriage 10 may be constructed from any material which is desired. As is illustrated, the channel 22 contains one section which functions as a return section for the balls and is formed as a generally U-shaped section 38 which is depressed further into the surface 20 of the carriage 10 than the remainder of the channel 22. The U-shaped section or portion of the channel 22 is formed in such a manner that the balls 18 are freely movable within the channel but, at the same time, are restrained so that they remain within the track. It should be noted that the arms of the U-shaped channel are effectively closed by the end section 40 of the support member 16, thereby trapping the balls internally within this portion of the track so that they cannot be dislodged therefrom, that is, the end section 40 completes the continuous track 22. A second section of the track is formed effectively by a V-shaped channel 42 within which the balls 18 are positioned.

The balls are firmly retained in an opposed V-shaped groove 52 formed in the surface 54 of the support member 16 by forces generated by the spring 28 interconnected between the support members 16 and the chassis 14. As will be noted, the support member 16 is fixed relative to the carriage 10 and the groove 52 formed therein thus also remains fixed. As a result, the groove 52 provides the defined path along which the carriage 10 moves responsive to the force being applied thereto by the motor 30. As the carriage moves the balls 18 contained within the track 22 are thus circulated.

On the opposite surface 60 of the carriage 10, there is provided a pair of curved channels 62 and 64 within which the balls 24 are permitted to continuously and freely circulate. As is noted, the channel 62 is generally U-shaped in cross-sectional configuration with one surface 66 thereof being depressed slightly less than the other surface 68 thereof into the surface 60 of the carriage 10. As a result, the balls 24 which are within the section 66 are in contact with the chassis 14 while the balls within the section 68 are restrained within the channel by the chassis 14 but are not contacted by it. As a result, only the balls which contact the chassis 14 have a force applied thereto. A similar relationship exists between the sections 70 and 72 of the track 64, as illustrated.

Figure 4:
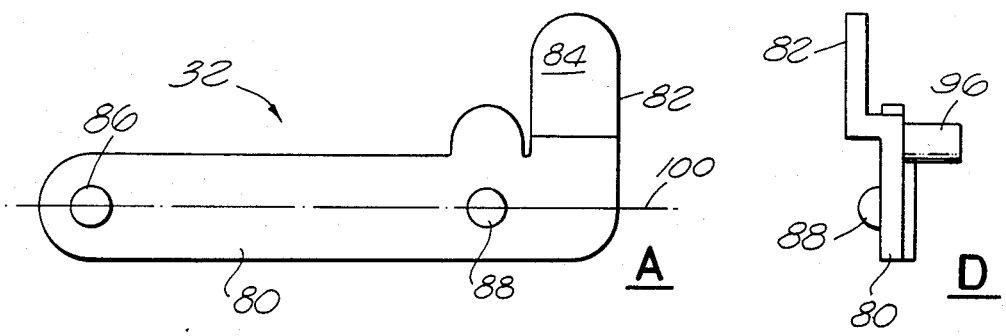
FIG. 4A is a bottom view of the angular carriage adjusting lever.
FIG. 4B is a cross-sectional side view of the angular carriage adjusting lever.
FIG. 4C is a top view of the angular carriage adjusting lever.
FIG. 4D is a cross-sectional front view of the angular carriage adjusting lever.
Figure 4:
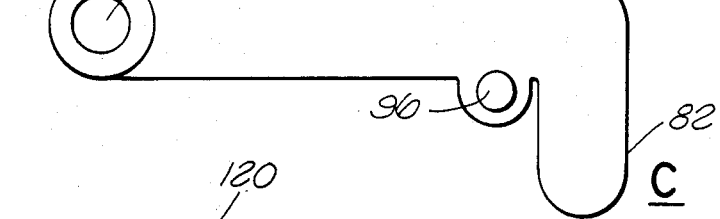

The angular carriage adjusting mechanism 32 is illustrated in FIG. 4 to which reference is hereby made. The adjusting mechanism 32, FIG. 4A, is preferably constructed from glass-filled polycarbonate which has been molded into the form as shown. The general configuration includes a body 80 having an arm 82 extending therefrom. The arm 82 includes a pad 84 which is engageable by an adjusting screw when the member 32 is installed in the disc drive mechanism. A pair of hemispherical protrusions 86 and 88 are formed on the lower surface 90, FIG. 4B, of the body 80. On the opposite surface 92 of the body 80 there is provided immediately beneath the protrusion 86 a conical depression 94. The term "conical depression" as used throughout the application includes any depression which has a general conical configuration in cross-section but specifically, in accordance with the present invention, includes a depression which is formed having three flat surfaces thus providing three points of contact when a spherical or hemispherical surface is received therein.

Referring to FIG. 4B from the opposite surface 92 of the body 80 is a post 96 which receives a spring as will be more fully described below. As will be seen and discussed in more detail below, the adjusting member 32 pivots about an axis 100 which is drawn through the center of the protrusions 86 and 88 in response to forces applied by the adjusting screw to the pad 84.

Figure 5:
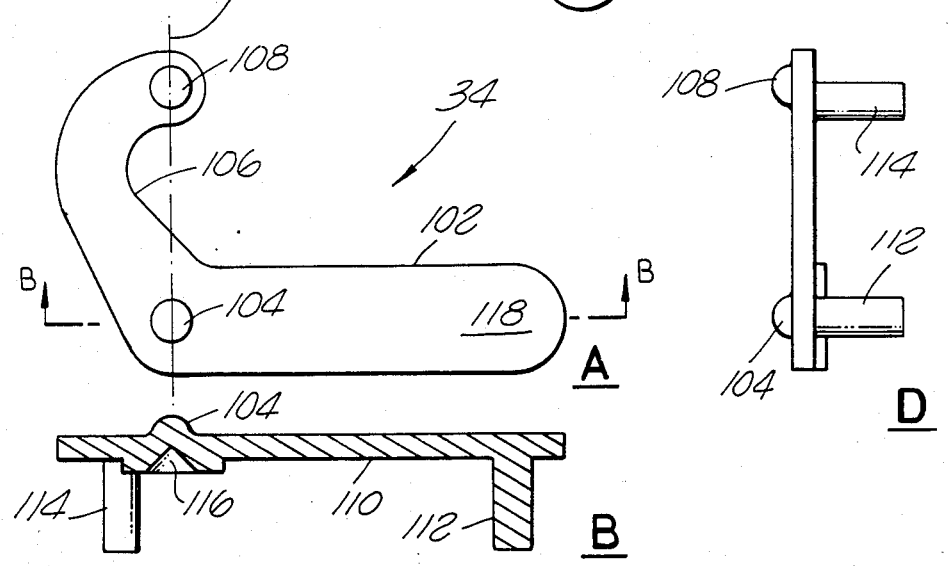
FIG. 5A is a bottom view of the radial carriage adjusting lever.
FIG. 5B is a cross-sectional side view of the radial carriage adjusting lever.
FIG. 5C is a top view of the radial carriage adjusting lever.
FIG. 5D is a cross-sectional front view of the radial carriage adjusting lever.
Figure 5:
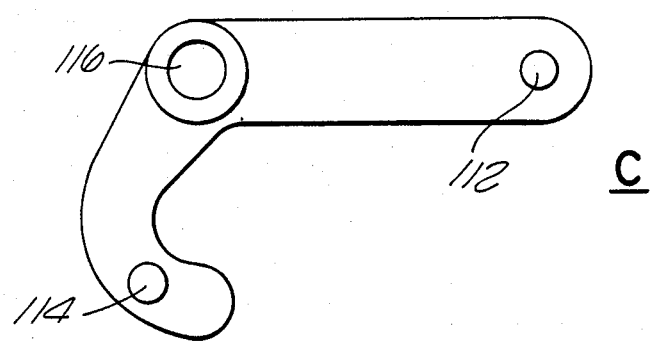

Referring now to FIG. 5, the radial adjusting member 34 is illustrated in greater detail. As can be seen, the radial adjusting member 34 is a "J"-shaped molded plastic member constructed of fiberglass-filled polycarbonate, FIG. 4A. The leg 102 of the member 34 includes a hemispherical protrusion 104 thereon, while the foot 106 thereof includes a hemispherical protrusion 108 formed at the toe as is illustrated. Referring to FIGS. 5A and 5D the surface 110 of the member 34 have a pair of posts 112 and 114 which receive springs as will be shown and described below. Post 114 extends from a position nearly opposite the hemispherical projection 108 while the post 112 is positioned at the opposite end of the member 34. Formed opposite the protrusion 104 is a conical depression 116. A pad 118 receives an adjusting screw as will be discussed more fully below and as a result of the forces applied thereby the member 34 rotates about an axis defined through the center of the protrusions 104 and 108 as is illustrated at 120.

By reference to FIGS. 6 and 7 the assembly of the adjusting members 32 and 34 along with the carriage 10 between the support member 16 and the chassis 14 is more fully illustrated. As will be recalled, the spring 28 extending between the support member 16 and the chassis 14 applies biasing to urge these members toward each other. It will be noted that springs 122, 124 and 126 are positioned around the posts 96, 112 and 114 respectively and are in compression such that as viewed in FIGS. 6 and 7, the adjusting members 32 and 34 are urged toward the chassis 14.

It should be noted that the chassis 14 has formed therein a pair of V-shaped sockets 130 and 132. A hemispherical shaped protrusion 134 extending from the support member 16 is received from within the V-shaped socket 132. The hemispherical protrusion 86 formed on the upper surface of the adjusting member 32 is received within the V-shaped socket 130. An additional hemispherical protrusion 136 formed on the support member 16 is received within the conical socket 94 of the adjusting member 32. The chassis 14 also has formed therein a conical socket 138 within which is received the protrusion 104 formed on the upper surface of the adjusting member 34. The hemispherical protrusion 88 on the upper surface of the adjusting member 32 fits within the conical socket 116 formed in the under surface of the adjusting member 34. It will also be noted that the chassis 14 has formed therein an additional "V" shaped socket 140 which receives the hemispherical protrustion 108 of the adjusting member 34.

A pair of adjusting screws 142 and 144 are threadably received within threaded openings provided in bores formed by the upstanding collars 146 and 148 respectively on the chassis 14. Polyamide patches 150 and 152 are provided on the adjusting screws 142 and 144 respectively so that the screws will have sufficient frictional engagement with the threads formed internally in the collars 146 and 148 to retain the position to which they are turned during the adjustment or alignment of the carriage 10.

As will now be recognized, the biasing of the spring 28 urges the support member 16 toward the chassis member 14 and as a result seats the protrusion 134 within the V-shaped socket 132 and seats the protrusion 136 within the conical socket 94 which in turn causes the protrusion 86 to seat within the V-shaped socket 130. It should also be noted that the carriage 10 is directly connected to the support member 16 as a result of the balls 18 riding within the enclosed channel formed by the V-shaped grooves 42 and 52 as shown in FIG. 3. As a result, any movement of the support member 16 will necessarily cause the carriage 10 to move accordingly. Such movement of the carriage 10 will in turn move the magnetic transducers 160 carried by the carriage 10.

Each of the adjusting screws 142 and 144 defines a recess therein which is adapted to receive an adjusting tool and openings are provided in the exterior cover (not shown) of the housing through which the tool may be inserted to engage the adjusting screws 142 and 144.

As has been above pointed out, the magnetic transducers 160 which are carried on the movable carriage 10 move in an essentially linear locus by virtue of the essentially linear travel of the carriage 10 as defined by the groove 52. For the magnetic transducers to read and write data in conformance to a standard magnetic disc format, it is necessary that the locus of the magnetic transducer if extended towards the axis of the data disc be adjusted relative to that axis within a small tolerance.

This requirement is accomplished in the preferred embodiment of the present invention by means of the angular adjusting screw 142. As above pointed out, the angular adjusting screw contacts the pad 84 on the angular carriage adjuster member 32 which is biased by the spring 122 against the screw 142. When the adjusting screw 142 is rotated, pad 84 is advanced or withdrawn causing angular carriage adjuster 32 to pivot about the axis 100 through the centers of spherical projections 86 and 88. As angular carriage adjuster 32 pivots, conical socket 94 on the adjuster moves at right angles to that axis of rotation. Spherical projection 136 on support member 16 must move with conical socket 94, and as a result, support member 16 rotates about spherical projection 134. By this means, the parts can be fabricated to relatively loose tolerances, and the finished drive can then be brought into very close conformance to a standard format. This angular adjustment is made by inserting a precisely written data disc into the drive, and then interpreting changes in data readings while adjusting screw 142 until the desired position is obtained.

This adjustment is also useful for purposely departing from a standard disc format in order to recover data from a faulty or nonstandard data disc.

It is also necessary that the magnetic transducers when positioned to read or write data, be located within very narrow limits, at standardized radial distances from the center of rotation of the data disc. In the preferred embodiment, this is accomplished by means of radial adjusting screw 144. When radial adjusting screw 144 is rotated, pad 118 is advanced or withdrawn, pivoting radial carriage adjuster 34 about the axis 120 through the centers of spherical projections 104 and 108. As radial carriage adjuster 34 pivots, conical socket 116 on the adjuster 34 moves at right angles to that axis of rotation. Spherical projection 88 on angular carriage adjuster 32 must move with conical socket 116 and therefore the angular carriage adjuster slides linearly along "V" socket 130 and against adjusting screw 142. This linear movement of the angular carriage adjuster is imparted to the support member 16 by means of spherical projection 136 engaged in conical socket 94, and as a result, spherical projection 134 slides linearly in "V" socket 132. Support member 16 contains the motive means for positioning the carriage 10 and therefore, by adjusting the position of the support member 16, the discrete magnetic transducer positions are adjusted.

By this means associated parts can again be fabricated to relatively loose tolerances, and the finished drive can then be brought into very close conformance to a standard disc format. This radial adjustment is also made by inserting a precisely written data disc into the drive, and then interpreting changes in data readings while adjusting screw 144 until the desired position is obtained.

Again, this adjustment is useful for realigning a drive which has lost accuracy over a period of time, and for purposely departing from a standard format in order to recover data from a faulty or nonstandard data disc.

The radial and angular carriage adjustments are highly leveraged to permit very accurate adjustments, and their total travel is very limited. Additionally, it is the purpose of these adjustments to create nominally similar assemblies from slightly dissimilar parts. As a result, and because of the large air gaps in the positioner stepper motor, the armature of this motor can be moved with the support member 16 while these adjustments are being made, although the stators of the motor are rigidly fixed to the chassis and printed circuit board. This is an advantage of the present invention over prior art, in that the coil assemblies can be directly and permanently soldered to the printed circuit board, eliminating the cost of fabricating and installing flexible leads, and that the heat generated in the coils is conducted to the printed circuit board and chassis, rather than to the support member where it would distort the carriage positioning mechanism through thermal expansion.

What is claimed is:

1. In a magnetic disc drive having magnetic transducer means carried by a carriage supported within a chassis and linearly moveable therein with respect to a magnetic disc, the improvement for adjusting the position of said transducer means comprising:

A. First adjusting means for moving said carriage along a linear path which is tangential to any concentric path with respect to the axis of rotation of said magnetic disc; and B. Second adjusting means for moving said carriage along a linear path which is a radius of said magnetic disc whereby said first mentioned linear path is orthogonal to said second mentioned linear path, said first and second adjusting means being operative when said disc drive is rotating a magnetic disc.

2. In a magnetic disc drive having magnetic transducer means carried by a carriage supported within a chassis and moveable therein with respect to a magnetic disc, the improvement for adjusting the position of said transducer means comprising:

A. First lever;
   B. Second lever;
   C. Support means;
   D. Spring means engaging said support means and said chassis for biasing said support means toward said chassis;
   E. Said first and second levers disposed between said support means and said chassis, said first lever engaging said support means and said chassis, and said second lever engaging said chassis and said first lever;
   F. First and second adjusting screws engaging said first and second levers respectively, the engagement between said levers and said support means and said chassis being mating surfaces whereby movement of said first lever responsive to the movement of said first adjusting screw moves said support means along a linear path which is tangential to a concentric path with respect to the axis of rotation of said magnetic disc, and said second lever responsive to movement of said second adjusting screw moves said support means along a linear path which is a radius of said magnetic disc whereby said first mentioned linear path is orthogonal to said second mentioned linear path.

3. In a magnetic disc drive having magnetic transducer means carried by a carriage supported within a chassis and linearly moveable therein with respect to a magnetic disc, the improvement for adjusting the position of said transducer means comprising:

A. First adjusting means for moving said carriage along a linear path which is tangential to any concentric path with respect to the axis of rotation of said magnetic disc, said first adjusting means includes a first adjusting screw threadably received within a first threaded opening in said chassis; and B. Second adjusting means for moving said carriage along a linear path which is a radius of said magnetic disc whereby said first mentioned linear path is orthogonal to said second mentioned linear path, said second adjusting means includes a second adjusting screw threadably received within a second threaded opening in said chassis and said first and second adjusting means being operative when said disc drive is rotating a magnetic disc.

4. The magnetic transducer adjusting means as defined in claim 3 which further includes means for retaining said screws in position subsequent to the movement thereof for accomplishing the adjustment of said transducer means position, said retaining means disposed between each of said screws and said chassis.

5. The magnetic transducer adjusting means as defined in claim 3 wherein said first adjusting means further includes a first lever contacting said first adjusting screw which enables said first lever to rotate about a first axis, said second adjusting means further includes a second lever contacting said second adjusting screw which enables said second lever to rotate about a second axis, said first and second axes are orthogonal with respect to each other.

6. The magnetic transducer adjusting means as defined in claim 5 which further includes a support member for supporting said carriage within said chassis and in contact with said second lever, rotation of said first or second levers about said first or second axis respectively moves said support member.

7. In a magnetic disc drive having magnetic transducer means carried by a carriage supported within a chassis and moveable therein with respect to a magnetic disc, the improvement for adjusting the position of said transducer means comprising:

A. First lever member;
   B. First adjusting screw disposed in contact with said first lever member, said first adjusting screw rotating said first lever member about a first predetermined axis;
   C. Second lever member;
   D. Second adjusting screw disposed in contact with said second lever member, said second adjusting screw rotating said second lever member about a second predetermined axis;
   E. Said first and second predetermined axes are orthogonal with respect to each other;
   F. Support means;
   G. Spring means engaging said support means and said chassis for biasing said support means toward said chassis;
   H. Said first and second lever members disposed between said support means and said chassis, one of said lever members engaging said support means and said chassis, and the other of said lever members engaging said chassis and said first mentioned lever member;
   I. First and second adjusting screws engaging said first and second lever members respectively, the engagement between said lever members and said support member and said chassis being mating surfaces whereby movement of said first lever responsive to the movement of said first adjusting screw moves said support means along a linear path which is tangential to a concentric path with respect to the axis of rotation of said magnetic disc, and said second lever responsive to movement of said second adjusting screw moves support member along a linear path which is a radius of said magnetic disc whereby said first mentioned linear path is orthogonal to said second mentioned linear path.

8. The magnetic transducer adjusting means as defined in claim 7 wherein the axis of rotation of each of said first and second levers is defined by a pair of protrusions extending outwardly from one surface of each of said levers.

9. The magnetic transducer adjusting means as defined in claim 8 wherein each of said levers defines a socket on the other surface thereof which is opposite said surface defining said protrusions, said socket on one of said levers engaging a protrusion on the other of said levers and the socket on the other of said levers engaging said support means.

10. The magnetic transducer adjusting means as defined in claim 9 which further includes spring means engaging said first and second levers for biasing said levers into contact with said first and second adjusting screws respectively.

* * * * *